US011405469B2

(12) United States Patent
Hodge

(10) Patent No.: US 11,405,469 B2
(45) Date of Patent: Aug. 2, 2022

(54) SYSTEM AND METHOD FOR PERSONALIZED VIRTUAL REALITY EXPERIENCE IN A CONTROLLED ENVIRONMENT

(71) Applicant: **GLOBAL TEL*LINK CORPORATION**, Reston, VA (US)

(72) Inventor: Stephen L. Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 17/235,118

(22) Filed: Apr. 20, 2021

(65) Prior Publication Data

US 2021/0314408 A1    Oct. 7, 2021

Related U.S. Application Data

(63) Continuation of application No. 16/558,931, filed on Sep. 3, 2019, now Pat. No. 10,986,187, which is a (Continued)

(51) Int. Cl.
    *G06F 15/16*    (2006.01)
    *H04L 67/141*    (2022.01)
    (Continued)

(52) U.S. Cl.
    CPC ........ *H04L 67/141* (2013.01); *H04L 63/0861* (2013.01); *H04L 67/306* (2013.01); *H04W 12/065* (2021.01); *G06F 3/011* (2013.01)

(58) Field of Classification Search
    None
    See application file for complete search history.

(56) References Cited

U.S. PATENT DOCUMENTS 9,256,748 B1 *    2/2016    Gates ..................... G06F 21/60
9,762,851 B1    9/2017    Baumert et al.
(Continued)

FOREIGN PATENT DOCUMENTS

CN    105913364 A    8/2016
WO    WO 2009/077901 A1    6/2009
WO    WO-2016018488 A2 *    2/2016    ......... G02B 27/0093

OTHER PUBLICATIONS

International Search Report and Written Opinion directed to International Patent Application No. PCT/US2017/034694, dated Aug. 16, 2017; 13 pages.
(Continued)

*Primary Examiner* — Phyllis A Book
(74) *Attorney, Agent, or Firm* — Sterne, Kessler, Goldstein & Fox P.L.L.C.

(57) ABSTRACT

A system and method for initiating a personalized virtual reality session via a virtual reality communication system in a controlled environment is disclosed. The system includes a profile subsystem configured to store an inmate profile of the inmate of the controlled environment. The system also includes a virtual reality subsystem that retrieves the inmate profile associated with the inmate from the profile subsystem, initiates the virtual reality session involving a first communication device used by the inmate of the controlled environment, and personalizes the virtual reality session based on the inmate profile. The system also includes a communication subsystem configured to transmit information related to the virtual reality session to a monitoring system.

20 Claims, 10 Drawing Sheets

Related U.S. Application Data continuation of application No. 15/419,772, filed on Jan. 30, 2017, now Pat. No. 10,404,804.

(51) Int. Cl.
*H04L 67/306* (2022.01)
*H04L 9/40* (2022.01)
*H04W 12/065* (2021.01)
*G06F 3/01* (2006.01)

(56) References Cited

U.S. PATENT DOCUMENTS

| | | | |
|---|---|---|---|
| 10,013,980 B2 | 7/2018 | Borsutsky et al. | |
| 10,404,804 B2 | 9/2019 | Hodge | |
| 10,580,043 B2* | 3/2020 | Publicover | H04W 4/21 |
| 10,685,488 B1* | 6/2020 | Kumar | A61H 23/04 |
| 10,986,187 B2 | 4/2021 | Hodge | |
| 2002/0133347 A1 | 9/2002 | Schoneburg et al. | |
| 2003/0220972 A1 | 11/2003 | Montet et al. | |
| 2004/0078204 A1 | 4/2004 | Segond et al. | |
| 2006/0206471 A1 | 9/2006 | Tsuzuki et al. | |
| 2007/0071206 A1 | 3/2007 | Gainsboro et al. | |
| 2007/0233839 A1 | 10/2007 | Gaos | |
| 2007/0288598 A1* | 12/2007 | Edeker | H04L 67/38 |
| | | | 709/217 |
| 2008/0183678 A1 | 7/2008 | Weston et al. | |
| 2008/0263165 A1 | 10/2008 | Hui et al. | |
| 2008/0281790 A1 | 11/2008 | Prosser et al. | |
| 2009/0182872 A1 | 7/2009 | Hong | |
| 2009/0193123 A1 | 7/2009 | Mitzlaff | |
| 2009/0254836 A1 | 10/2009 | Bajrach | |
| 2011/0209159 A1 | 8/2011 | Baratz et al. | |
| 2011/0258148 A1 | 10/2011 | Gao | |
| 2012/0041903 A1 | 2/2012 | Beilby et al. | |
| 2012/0069131 A1 | 3/2012 | Abelow | |
| 2012/0095835 A1 | 4/2012 | Makar et al. | |
| 2012/0101970 A1 | 4/2012 | Zernik et al. | |
| 2012/0183137 A1 | 7/2012 | Laughlin | |
| 2012/0260263 A1 | 10/2012 | Edoja | |
| 2012/0262271 A1* | 10/2012 | Torgersrud | G06F 21/32 |
| | | | 382/118 |
| 2012/0271805 A1 | 10/2012 | Holenstein et al. | |
| 2013/0050199 A1 | 2/2013 | Chavez | |
| 2013/0051548 A1 | 2/2013 | Chavez | |
| 2013/0066750 A1 | 3/2013 | Siddique et al. | |
| 2013/0191898 A1 | 7/2013 | Kraft | |
| 2013/0263227 A1 | 10/2013 | Gongaware et al. | |
| 2014/0002444 A1 | 1/2014 | Bennett et al. | |
| 2014/0058812 A1 | 2/2014 | Bender et al. | |
| 2014/0100464 A1* | 4/2014 | Kaleal | A61B 5/486 |
| | | | 600/595 |
| 2014/0156796 A1 | 6/2014 | Hong et al. | |
| 2014/0250195 A1 | 9/2014 | Capper et al. | |
| 2014/0279050 A1 | 9/2014 | Makar et al. | |
| 2015/0099946 A1* | 4/2015 | Sahin | A61B 7/04 |
| | | | 600/301 |
| 2015/0168150 A1 | 6/2015 | Kahn et al. | |
| 2015/0206329 A1 | 7/2015 | Devries | |
| 2015/0223731 A1* | 8/2015 | Sahin | A61B 5/1123 |
| | | | 600/301 |
| 2015/0244699 A1 | 8/2015 | Hessler | |
| 2015/0248649 A1 | 9/2015 | Avats | |
| 2015/0310344 A1 | 10/2015 | Gunjan | |
| 2015/0324562 A1 | 11/2015 | Scavezze et al. | |
| 2015/0326570 A1* | 11/2015 | Publicover | H04N 5/23229 |
| | | | 382/117 |
| 2015/0348329 A1 | 12/2015 | Carre et al. | |
| 2016/0042648 A1* | 2/2016 | Kothuri | A63F 13/92 |
| | | | 434/236 |
| 2016/0049094 A1* | 2/2016 | Gupta | G09B 9/00 |
| | | | 434/185 |
| 2016/0071326 A1 | 3/2016 | Spivack | |
| 2016/0140320 A1 | 5/2016 | Moturu et al. | |
| 2016/0156625 A1 | 6/2016 | Hodge et al. | |
| 2016/0162946 A1 | 6/2016 | Delli Santi et al. | |
| 2016/0180590 A1 | 6/2016 | Kamhi et al. | |
| 2016/0193732 A1 | 7/2016 | Breazeal et al. | |
| 2016/0195923 A1 | 7/2016 | Nauseef et al. | |
| 2016/0253428 A1 | 9/2016 | Hasan | |
| 2016/0373397 A1 | 12/2016 | Kesten et al. | |
| 2016/0381416 A1 | 12/2016 | Fan et al. | |
| 2017/0041454 A1 | 2/2017 | Nicholls et al. | |
| 2017/0080346 A1 | 3/2017 | Abbas | |
| 2017/0083714 A1 | 3/2017 | Keiser et al. | |
| 2017/0123649 A1 | 5/2017 | Clavel et al. | |
| 2017/0124573 A1 | 5/2017 | Hall et al. | |
| 2017/0139916 A1 | 5/2017 | Cama et al. | |
| 2017/0162072 A1* | 6/2017 | Horseman | A61B 5/4884 |
| 2017/0236407 A1 | 8/2017 | Rhoads et al. | |
| 2017/0316186 A1 | 11/2017 | Breitenfeld et al. | |
| 2017/0353404 A1 | 12/2017 | Hodge | |
| 2018/0012408 A1 | 1/2018 | Gentilin et al. | |
| 2018/0205996 A1 | 7/2018 | Caporaletti et al. | |
| 2018/0219950 A1 | 8/2018 | Hodge | |
| 2018/0240275 A1 | 8/2018 | Clements et al. | |
| 2018/0276895 A1 | 9/2018 | Hodge | |
| 2019/0394282 A1 | 12/2019 | Hodge | |

OTHER PUBLICATIONS

International Search Report and Written Opinion directed to International Patent Application No. PCT/US2018/015989, dated Apr. 12, 2018; 18 pages.

International Search Report and Written Opinion directed to International Patent Application No. PCT/US2018/024616, dated Jun. 14, 2018; 17 pages.

Extended European Search Report directed to related European Patent Application No. 18744423.7, dated Jul. 31, 2020; 7 pages.

International Preliminary Report on Patentability directed to International Patent Application No. PCT/US2018/015989, dated Jul. 30, 2019; 9 pages.

International Preliminary Report on Patentability directed to International Patent Application No. PCT/US2017/034694, dated Dec. 11, 2018; 7 pages.

International Preliminary Report on Patentability directed to International Patent Application No. PCT/US2018/024616, dated Oct. 1, 2019; 11 pages.

* cited by examiner

SYSTEM AND METHOD FOR PERSONALIZED VIRTUAL REALITY EXPERIENCE IN A CONTROLLED ENVIRONMENT

CROSS REFERENCE TO RELATED APPLICATIONS

This application is a continuation of U.S. Nonprovisional patent application Ser. No. 16/558,931, filed Sep. 3, 2019, which is a continuation of U.S. Pat. No. 10,404,804, filed Jan. 30, 2017, and all of which are entitled "System and Method for Personalized Virtual Reality Experience in a Controlled Environment," the contents of all are hereby incorporated herein by reference in their entirety

BACKGROUND

Field

This disclosure relates to a system and method for providing a monitored virtual reality experience within a controlled environment.

Background

In a controlled environment such as a correctional facility, inmates have limited opportunities to interact with the outside world. Inmates may have opportunities to have certain communications with loved ones, browse websites using a mobile device, or interact with certain content, but these opportunities are limited to the inmate's room or cell and designated rooms within the controlled environment. In other words, an inmate's experiences are limited to one or two physical communications when conducting conventional communications in a controlled environment.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
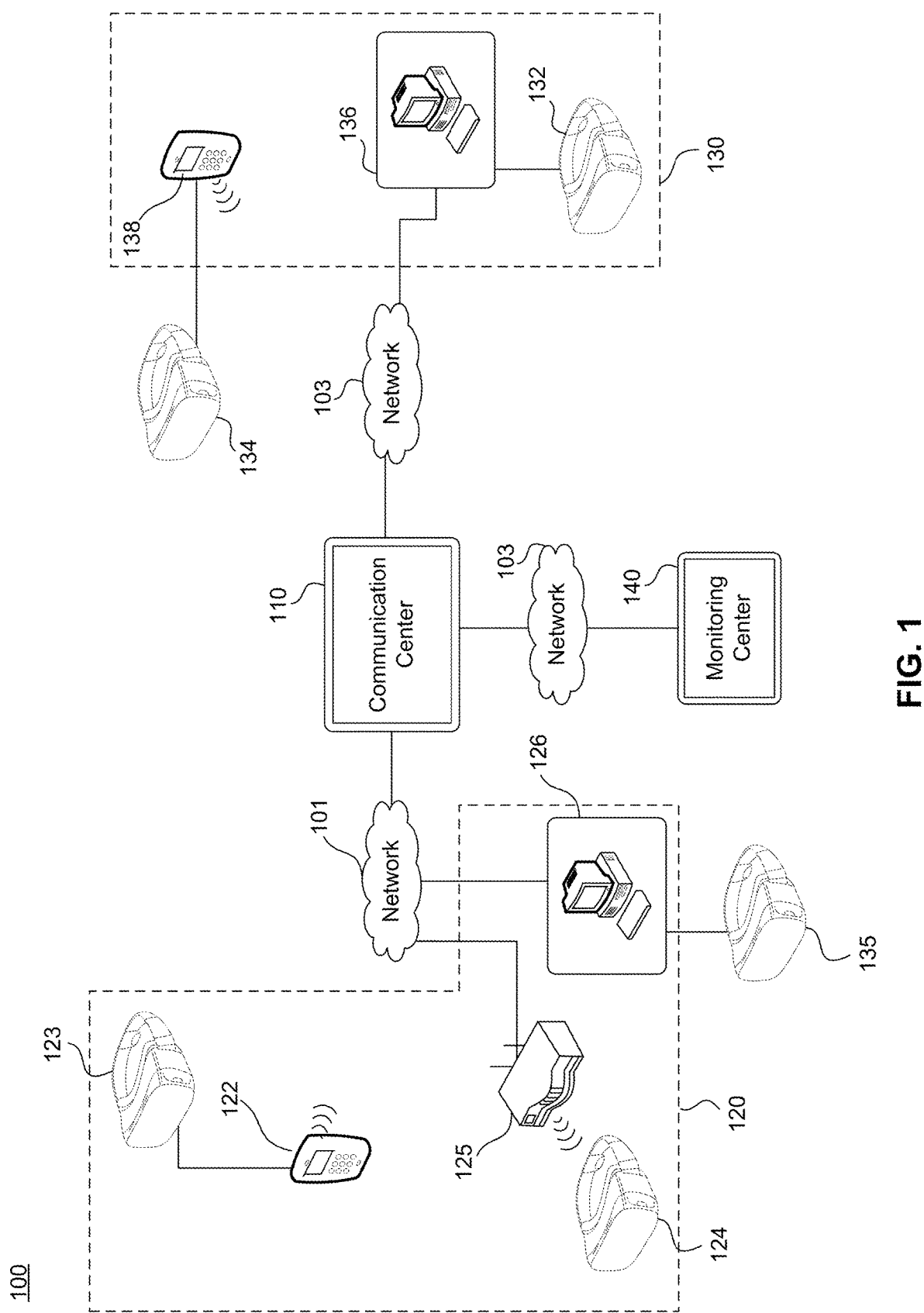
FIG. 1 illustrates a block diagram of a virtual reality communication system, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Virtual Reality Communication System

FIG. 1 illustrates a block diagram of virtual reality communication system 100, according to embodiments of the present disclosure. Virtual reality communication system 100 includes communication center 110 configured to receive and transmit virtual reality information within a virtual reality session to inmate communication system 120. A virtual reality session allows an inmate of a controlled environment to interact with content in virtual environment and, for a brief time, imagine himself outside or away from the controlled environment.

In some embodiments, the virtual reality session can also include outsider communication system 130 if an outsider is authorized and registered and otherwise allowed to communicate with the inmate associated with inmate communication system 120. In this disclosure, a session refers to a virtual reality communication, which may include real-time communications such as voice calls and video calls, and non-real time communications such as a text or email, between an inmate using inmate communication system 120, communication center 110, and an outsider using outsider communication system 130.

In an embodiment, inmate communication system 120 includes one or more devices provided to inmates within a correctional facility and includes any or all devices such as wireless communication device 122, virtual reality communication devices 123, 124, and 136, and/or computer station 126. In an embodiment, virtual reality communication device 135 is connected to computer station 126 and virtual reality communication device 136 is connected to wireless communication device 122. Virtual reality communication devices 123, 124, and 136 have wired and/or wireless communication capabilities. In an embodiment, virtual reality communication device 124 may communicate directly with network 101 through a wireless connection, such as Bluetooth™ or Wi-Fi connections. In another embodiment, virtual reality communication device 124 may communicate directly with network 101 through a wired connection such as a USB cable.

Similarly, virtual reality communication device 123 communicates with network 101 through a connection with wireless communication devices 122. The communication with wireless communication devices 122 may be a wireless connection, such as Bluetooth™ or Wi-Fi connections or through a wired connection such as with a USB cable.

In an embodiment, virtual reality communication device 136 communicates with network 101 through a connection with computer station 126. The communication with computer station 126 may be a wireless connection, such as Bluetooth™ or Wi-Fi connections or through a wired connection such as with a USB cable.

In an embodiment, communication center 110 connects to wireless access point 125 (e.g., a router), which may provide connectivity to virtual reality communication device 124. Inmate communication system 120 connects to communication center 110 via network 101, which may include any or all of a Local-Area Network (LAN), a Wide-Area Network (WAN), or the Internet.

Outsider communication system 130 includes one or more devices available to outsiders to the controlled environment and includes any and all devices such as virtual reality communication device 132, virtual reality communication device 134, computer station 136, and/or wireless communication device 138. In an embodiment, outside communication system 130 may be located within the controlled environment, such as in a designated area or room of the controlled environment. In another embodiment, outside communication system 130 may be located outside of the controlled environment such as in the outsider's home. Outsider communication system 130 connects to communication center 110 via network 103, which may include any or all of a WAN, the Internet, and/or a Public Switched Telephone Network (PSTN). The WAN may facilitate communications with other nearby prisons, such as those within the same county, state, etc.

In an embodiment, WebRTC may be utilized in place of a session initiation protocol (SIP) over a WAN or the Internet, each of which provides a dedicated, private link between inmate communication system 120 and outsider communication system 130. The Internet is utilized to provide access to computer station 136 such as remotely distributed control stations, scheduling clients, and home visitation devices.

In an embodiment, virtual reality communication system 100 also includes monitoring center 140 for monitoring communications within virtual reality communication system 100 and between inmate communication system 120 and outsider communication system 130. Monitoring by monitoring center 140 occurs both automatically and manually by a reviewer. Monitoring center 140 is configured to receive communications from communication center 110 via network 105, which may include any or all of a LAN, a WAN, or the Internet. In an embodiment, monitoring center 140 is further configured to communicate with communication center 110 to indicate approval of starting, sending, or receiving a virtual reality session after an initial authentication of the virtual reality session has been performed. Monitoring center 140 receives information related to all virtual reality sessions that take place between devices in virtual reality communication system 100 through communication center 110. Monitoring center 140 can then utilize this information by recording the virtual reality session for later review and/or monitor the actions of users within the virtual reality communication system 100. In an embodiment, recording of the virtual reality session entails recording one or more aspects of the virtual reality session. Aspects of the virtual reality session include an audio stream of the virtual reality session, a video stream of the virtual reality session, and actions performed by the users during the virtual reality session. If users perform prohibited actions or interactions, monitoring center 140 may terminate the virtual reality session or provide a warning to the users. Monitoring center 140 may provide a predetermined number of warnings to the users prior to terminating the virtual reality session. In another embodiment, monitoring center 140 is integrated into communication center 110.

In an embodiment, monitoring center 140 provides to communication center 110 authorized content that is available for use as part of any virtual reality sessions. For example, authorized content includes a list of websites that are available to be accessed by a user within a virtual reality session, a list of websites that are not available to be accessed, a list of games, and a list of applications such as a word processing application, a text messaging application, a video calling application, and a multimedia application.

In an embodiment, content is authorized on a per user basis (i.e., applies only to a specific user or users based on, for example, the profile information) or on a global basis (i.e., applies to all virtual reality sessions through communication center 110). In Monitoring center 140 can modify user profiles to include information that indicates the content for which the users are authorized and not authorized. For global restrictions, monitoring center 140 can send information that indicates the content that is authorized and not authorized for all users and all virtual reality sessions.

Communication Center

Figure 2:
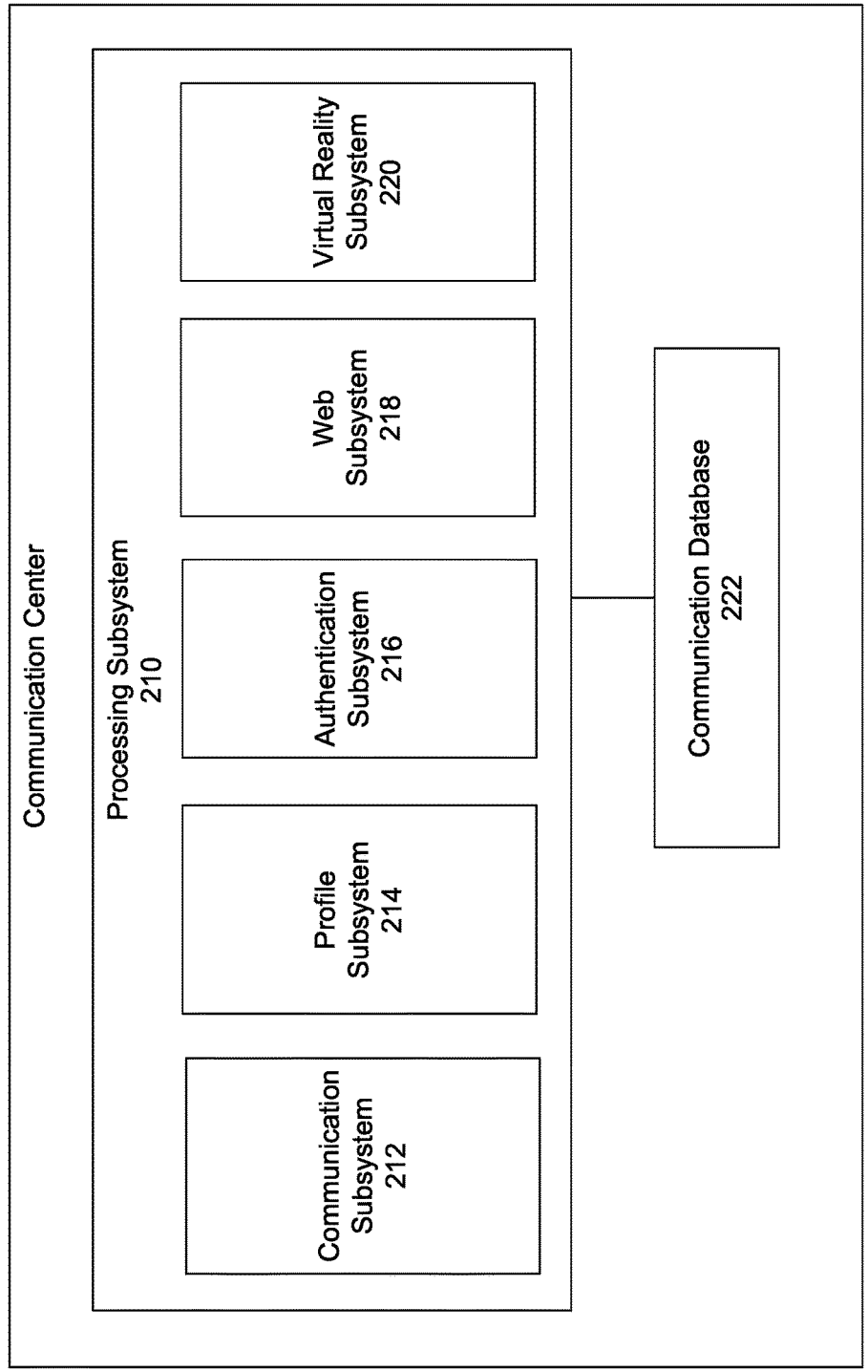
FIG. 2 illustrates a block diagram of a communication center of the virtual reality communication system of FIG. 1, according to embodiments of the present disclosure.

FIG. 2 illustrates a block diagram of communication center 200, according to embodiments of the present disclosure. In an embodiment, communication center 200 represents an exemplary embodiment of communication center 110 of FIG. 1. Communication center 200 includes at least processing subsystem 210 and communication database 220, as shown by FIG. 2. Processing subsystem 210 includes one or more processors, computers, or servers identified as subsystems and can be constructed as individual physical hardware devices, or as virtual devices, such as a virtual server. The number of processing subsystems can be scaled to match the number of simultaneous user connections desired to be supported by virtual reality communication system 100. Processing subsystem 210 includes communication subsystem 212, profile subsystem, 214, and authentication subsystem 216.

In an embodiment, communication subsystem 212 controls the routing of communications to an end destination such as one or more devices within inmate communication system 120, one or more devices within outsider communication system 130, or monitoring center 140. Communication subsystem 212 performs switching required to electrically connect the one or more devices within inmate communication system 120 and one or more devices within outsider communication system 130 for a virtual reality session. Further, communication subsystem 212 logs communication information, including time of communications and parties involved in the communications, and store the logs and communications as files. The files stored by communication subsystem 212 can be stored indefinitely for use by monitoring center 140 in monitoring and investigation of an inmate and/or communication. Communication subsystem 212 also determines whether a communication should be monitored such that privileged communications such as attorney/client, doctor/client, or investigative communications are not monitored. Criteria for monitoring a communication may be based on jurisdictional requirements and/or identities of the parties.

In an embodiment, communication subsystem 212 is configured to receive contact information such as a phone number, email address, internet protocol address or other identifying data of the parties involved in the communication. The received contact information may be used by each of the subsystems of the communication center 200 for identifying respective data and processes related to the contact information, such as purported identities of parties involved in the communication.

Because there may be a variety of different communication standards employed by different audio, video, image, and text devices that wish to participate in communications, in an embodiment, communication subsystem 212 is also configured to perform format conversion of non-real time communications. Conversion of incoming and outgoing communications are performed, as needed, to be compatible with inmate communication device 120, outsider communication device 130, or monitoring center 140.

Further, because communication subsystem 212 receives and transmits communications by way of a network, in an exemplary embodiment, communication subsystem 212 is configured to decrypt received communications and encrypt transmitting communications, for security purposes.

Profile subsystem 214 obtains and stores profile information on parties registered to communicate via virtual reality communication system 100. In an embodiment, profile subsystem 214 stores inmate profiles and outsider profiles. Profile subsystem 214 obtains information related to the parties from one or more of (a) a jail management system (JMS) or an offender management system (OMS) operated by the jurisdiction of the correctional facility, (b) public database containing information on the parties, or (c) a questionnaire provided by a web page, a personal approved number (PAN) list, or booking information. Information obtained by profile subsystem 214 may include personal information such as previous residences or correctional facilities, authorized contacts, family members, languages, special needs, medication requirements, etc.

Profile subsystem 214 also performs a registration process for those parties not enrolled or registered to use virtual reality communication system 100. During the registration process, or at a later time, profile subsystem 214 determines accommodations and settings associated with a party and/or a party is able to select preferred settings for a communication. These accommodations and settings include, but are not limited to, preferences of the virtual reality session, such as virtual locales (e.g., beach, forest) and avatar information such as the appearance of the party's virtual representation within the virtual reality session.

In an embodiment, profile subsystem 214 also receives authorization information indicating content that is authorized and not authorized for each profile. The information may be received from a monitoring system such as monitoring center 140 as illustrated in FIG. 1. Profile subsystem 214 can store the authorization information internally or in communication database 222. If the information is specific to a user or user(s), profile system 214 can also store the information as part of the user or user(s) profile(s). The authorization information is used to personalize the virtual reality session by limiting or allowing access to the content by users of the virtual reality session.

Authentication subsystem 216 collects and stores identity data of inmates and outsiders authorized to access virtual reality communication system 100. Identity data includes at least one of a username and password data, challenge questions, challenge answers, biometric data, device data such as make and model of a communication device, and/or location data. Biometric data includes one or more of a finger print, a hand print, a voice sample, an iris or retinal sample, an image of the user (2D or 3D), a hand geometry, a signature identification, an infrared camera identification, or any other biometric as deemed appropriate. The challenge question form of identity data may be a series of challenge questions, or a single challenge question such as the last four digits of an inmate's social security number, mother's maiden name, and the like. Authentication subsystem 216 is further configured to facilitate a secure communication between parties receiving/transmitting a communication by performing identity verifications to authenticate identities of purported parties. The identity verification includes logon verifications, such as username and password verifications, biometric verification, response to challenge questions, device verification, and/or location verification.

In embodiment, authentication subsystem 216 continuously tracks biometric information during an on-going virtual reality session. For example, authentication subsystem 216 continuously tracks a user's eyes and provides the iris or retinal sample to a monitoring center through communication subsystem 212. In this manner, the monitoring center may monitor the virtual reality session to insure that an authenticated user does not hand off the virtual reality communication device to another user who has not been authenticated by authentication subsystem 216. Authentication subsystem 216 may also continuously monitor the voices during the virtual reality session and provide this voice information to the monitoring subsystem through communication subsystem 212.

Authentication subsystem 216 performs an identity verification by receiving identity information such as one or more of a username and password, a response to a challenge question(s), a keypad or touch pad entry, dual tone multi frequency (DTMF) response, a voice sample, a fingerprint sample, a retinal sample, a facial image (2D or 3D), device information such as a make and model of the communication device, and/or a location of the communication device, from a communication device (such as a device of inmate communication system 120 or outsider communication system 130) used by a purported party and comparing the identity information of the purported party with stored identity data. Authentication subsystem 216 also uses the collected information to register users of virtual reality communication system 100. Once registered and entered into the system, users may log into virtual reality communication system 100 and initiate a virtual reality session.

Web subsystem 218 runs web server software such as Apache and/or Microsoft Internet Information Server and/or an interactive voice response (IVR) server software. The primary function of web subsystem 218 is to operate as a frontend and/or backend server in receiving and transmitting information to a party outside of communication center 200. In an embodiment, web subsystem 218 serves as a maintenance point into communication center 200, by which servicing, configuring, and updating can be performed. In an embodiment, the web subsystem 218 provides managing services for generating communications, receiving instructions from a party to send or receive communications, and coordinating and scheduling the transmission of communications. For example, web subsystem 218 can facilitate a party in generating a non-real time communication when the party uses a front-end application having a user interface.

In an embodiment, virtual reality subsystem 220 consists of any number of servers, and functions as the primary logic processing center in communication center 200. Virtual reality subsystem 220 manages and facilitates overall communication between subsystems off the communication center 200 and devices external to the communication center, such as any device within inmate communication system 120 and outsider communication system 130. After undergoing registration and authentication procedures as described above, virtual reality subsystem 220 initiates the virtual reality sessions for one or more virtual reality communication devices within virtual reality communication system. No matter the number of virtual communication devices, virtual reality subsystem 220 routes information regarding all virtual reality sessions to a monitoring center, such as monitoring center 140 in FIG. 1, through communication subsystem 212. Using this information, the monitoring center may monitor all aspects of virtual reality sessions, including the avatars, the actions taken by the avatars, the virtual reality environment such as the virtual details, and the interactions between the avatars and the virtual reality environment.

In an embodiment, virtual reality subsystem 220 initiates virtual reality sessions based on the stored profiles of the user(s) involved in the virtual reality session. An example profile is an inmate profile that includes the preferences of an inmate of a controlled environment and/or an outsider profile that includes the preferences of an outsider of the controlled environment. If a virtual reality session involves a user with a virtual reality communication device, virtual reality subsystem 220 retrieves the user profile for the user and personalizes the virtual reality session based on the preferences and information stored in the user profile. Personalizing the virtual reality session includes using a stored avatar with the stored appearance settings, setting the environment of the virtual reality session, and making available within the virtual reality session preferred content and applications such as games. If the virtual reality session involves two or more users, virtual reality subsystem 220 retrieves the user profiles for each of the users and personalizes the virtual reality session based on the preferences and information stored in the user profiles. If there are any conflicts in preferences, virtual reality subsystem 220 can prioritize certain user profiles and implement the preferences of user profiles that are prioritized higher than others.

In an embodiment, personalizing the virtual reality session also includes incorporating administrator preferences provided by an administrator of virtual reality system 100, such as a designated employee of the controlled environment. Administrator preferences are rules or restrictions provided by the administrator and have higher priority than the preferences specified in the user profiles. In an embodiment, administrator preferences include global preferences that influence all virtual reality sessions, no matter the users involved in the virtual reality session and inmate-specific preferences that only apply to specific inmates.

Administrator preferences generally limit or allow actions that can be performed by users during a virtual reality session. For example, the administrator can restrict all inmates and outsiders from accessing websites deemed to be inappropriate or certain applications and/or specify specific websites or applications that may be accessed during a virtual reality session. As discussed above, an administrator can implement such restrictions on a global (all virtual reality sessions) or inmate-specific basis.

In an embodiment, virtual reality subsystem 220 controls content that is available to users within virtual reality sessions based on authorization information indicating authorized content and unauthorized content. The authorization information can be specific to a user or user(s) and/or applied globally to all virtual reality sessions. Authorization information can indicate that a user or user(s) are not allowed to access certain content, such as websites, games, and/or applications, while participating in the virtual reality session. For example, if a user's profile indicates that the user is not allowed to access a certain website, the user would not prevented from using a virtual reality browser within a virtual reality session, such as virtual reality browser window 406 of FIG. 4B, to access the certain website.

Communication database 222 consists of any number of databases and/or servers, and stores and organizes data in a relational database. Communication database 222 runs a database management system, such as MYSQL™, to provide an example. Communication database 222 includes organized data such that respective identity data, authentication data, jurisdictional requirements and rules, and settings that are indexed and linked to allow access to data for each of the parties involved in a communication and data associated with each of the parties.

Virtual Reality Communication Device

Figure 3:
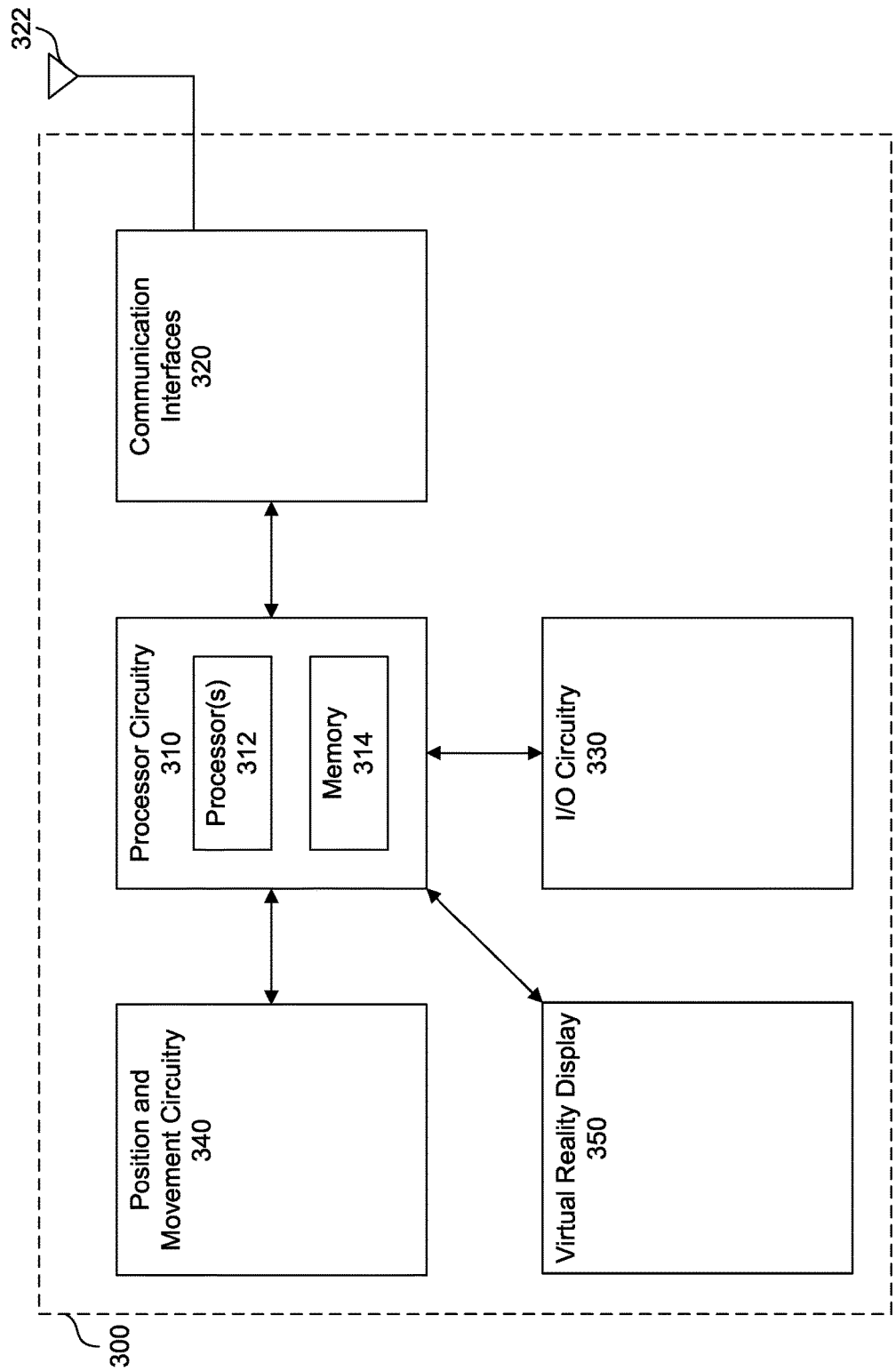
FIG. 3 illustrates a block diagram of a virtual reality communication device of the virtual reality communication of FIG. 1, according to embodiments of the present disclosure.

FIG. 3 illustrates a block diagram of virtual reality communication device 300, according to embodiments of the present disclosure. Virtual reality communication device 300 may be an exemplary embodiment of any of virtual reality communication devices 123, 124, 132, 134, or 135 as illustrated in FIG. 1. In an embodiment, virtual reality communication device 300 includes processor circuitry 310 that is communicatively coupled to plurality of communication interfaces 320, input/output circuitry 330, positional and motion circuitry 340, and virtual reality display 350. Processor circuitry 310 includes one or more processors 312, circuitry, and/or logic configured to control the overall operation of communication device 300, including the operation of communication interfaces 320, input/output circuitry 330, and positional and motion circuitry 340. Processor circuitry 310 further includes memory 314 to store data and instructions. Memory 314 may be any well-known volatile and/or non-volatile memory that is removable and/or non-removable.

Communication interfaces 320 include one or more transceivers, transmitters, and/or receivers that communicate via a wireless interface, such as through one or more antennas 322, or a wired interface, such as through a USB cable. In an embodiment, communication interfaces 320 are configured to transmit and receive communications between an inmate and an outsider via network 101 and network 103, as illustrated in FIG. 1. In an embodiment, communication interfaces 320 connect virtual reality communication device 300 with other devices such as a mobile device and/or external input devices such as a keyboard, mouse, camera, or touch interface.

In an embodiment, virtual reality communication device 300 includes integrated input/output circuitry 330 includes circuitry such as a keypad, a touch interface, a microphone, and a camera. Input/output circuitry 330 may be used by a party for traditional mobile device communications such as audio, video, or text communications. Input/output circuitry 330 such as the microphone and camera are used during monitoring operations to capture audio and/or video of a party and surrounding areas.

In an embodiment, virtual reality communication device 300 may include positional and motion sensors 340 include circuitry for determining a current location and a change in location of communication device 300. Positional and motion circuitry 340 may include such circuitry as Global Positioning System (GPS) technology, indoor positioning systems (IPS) technology, accelerometers, and/or gyroscopes to determine position and motion of virtual reality communication device 300.

Input/output circuitry 330 and positional and motion sensors 340 can provide input to virtual reality communication device 300 through head, body, arm, eye and finger, movements. Eye movement of a user of a virtual reality communication device 300 can be monitored. Eye movement of the user can operate much like a mouse by following the eye movement moving a cursor and utilizing the blinks of the eyes to select an item (i.e., similar to a mouse click). This allows for the entry of alpha numeric or the selection of items from the display without the user having to use his fingers or hands. Lunges and direction changes can be captured with accelerometers and gyroscope devices of positional and motion sensors 340.

Virtual reality display 350 is component for displaying virtual reality images or scenes for viewing by a user of the virtual reality communication device 300. In an embodiment, virtual reality display 350 is a display of a standalone virtual reality device that may be worn by a user. Virtual reality display 350 provides a high-resolution and wide angle view (e.g., 115 degrees) of a virtual reality session. In another embodiment, virtual reality display 350 may be implemented as a display of a mobile device such as a mobile phone, smartphone, or tablet. The mobile device may then be attached to a headpiece that may be worn by the user.

System Operation

Figure 4A:
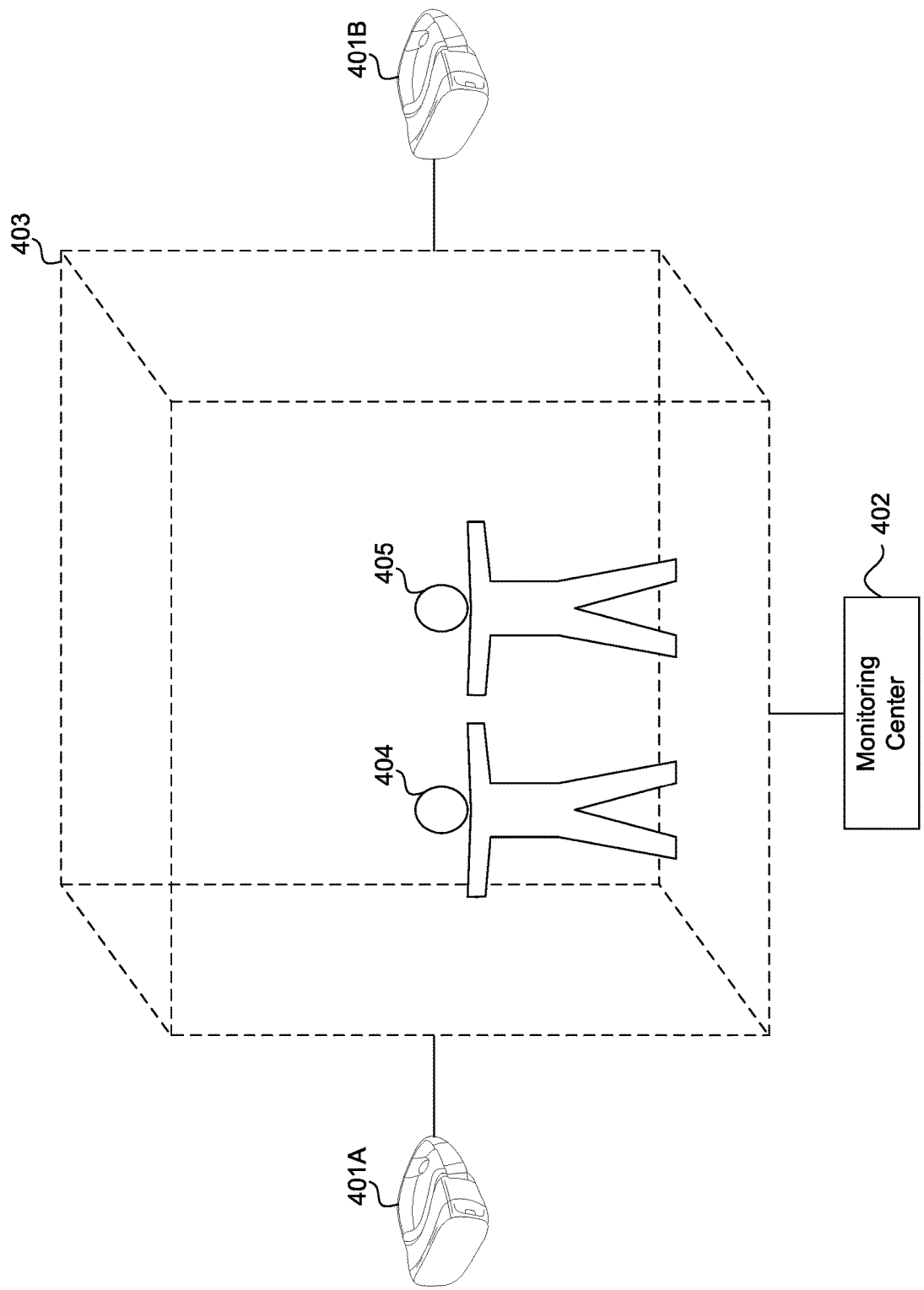
FIG. 4A illustrates a block diagram of a virtual reality communication system, according to embodiments of the present disclosure.

Exemplary usage of virtual reality communication system 100 in a correctional environment will be described with respect to FIGS. 4A-4C. In an embodiment, FIG. 4A depicts an exemplary embodiment of a virtual reality session 400A between inmate communication device 401A, outsider communication device 401B, and monitoring center 402. Virtual reality session 400A includes virtual reality communication 403 depicts an exemplary visual environment that is simultaneously viewable by inmate communication device 401A, outsider communication device 401B, and monitoring center 402. Virtual reality communication 403 is simultaneously viewable through a display of inmate communication device 401A and a display of outsider communication device 401B. Virtual reality communication 403 also provides an audio channel through which users of inmate communication device 401A and outsider communication device 401B talk with each other using for example a microphone of inmate communication device 401A and outsider communication device 401B or that is part of an external device connected to inmate communication device 401A and outsider communication device 401B. In an embodiment, virtual reality communication 403 includes an inmate avatar 404 and an outsider avatar 405. Inmate avatar 404 is a personalized virtual representation of a user of inmate communication device 401A and outsider avatar 405 is a personalized virtual representation of a user of outsider communication device 401B. As further discussed with respect to FIG. 5, a user, such as an inmate of a controlled environment or an outsider of the controlled environment, can customize his avatar as part of a registration process. Accordingly, users of inmate communication device 401A and outsider communication device 401B may talk with and view a virtual representation of each other as part of virtual reality communication 403.

In an embodiment, virtual reality communication 403 is also viewable by monitoring center 402. As will be further discussed with respect to FIG. 7, monitoring center 402 monitors virtual reality communication 403 including the actions of users of inmate communication device 401A and outsider communication device 401B. Monitoring center 402 monitors virtual reality communication 403 to prevent prohibited actions from occurring within virtual reality communication 403.

In an embodiment, inmate communication device 401A, outsider communication device 401B, and monitoring center 402 are implemented within a virtual reality communication system such as virtual reality communication system 100. One of ordinary skill in the art would understand that virtual reality session 403 is merely exemplary. For example, virtual reality session is not limited to only two users within virtual reality session 400A, which may include one user or more than two users participating in virtual reality communication 403.

Figure 4B:
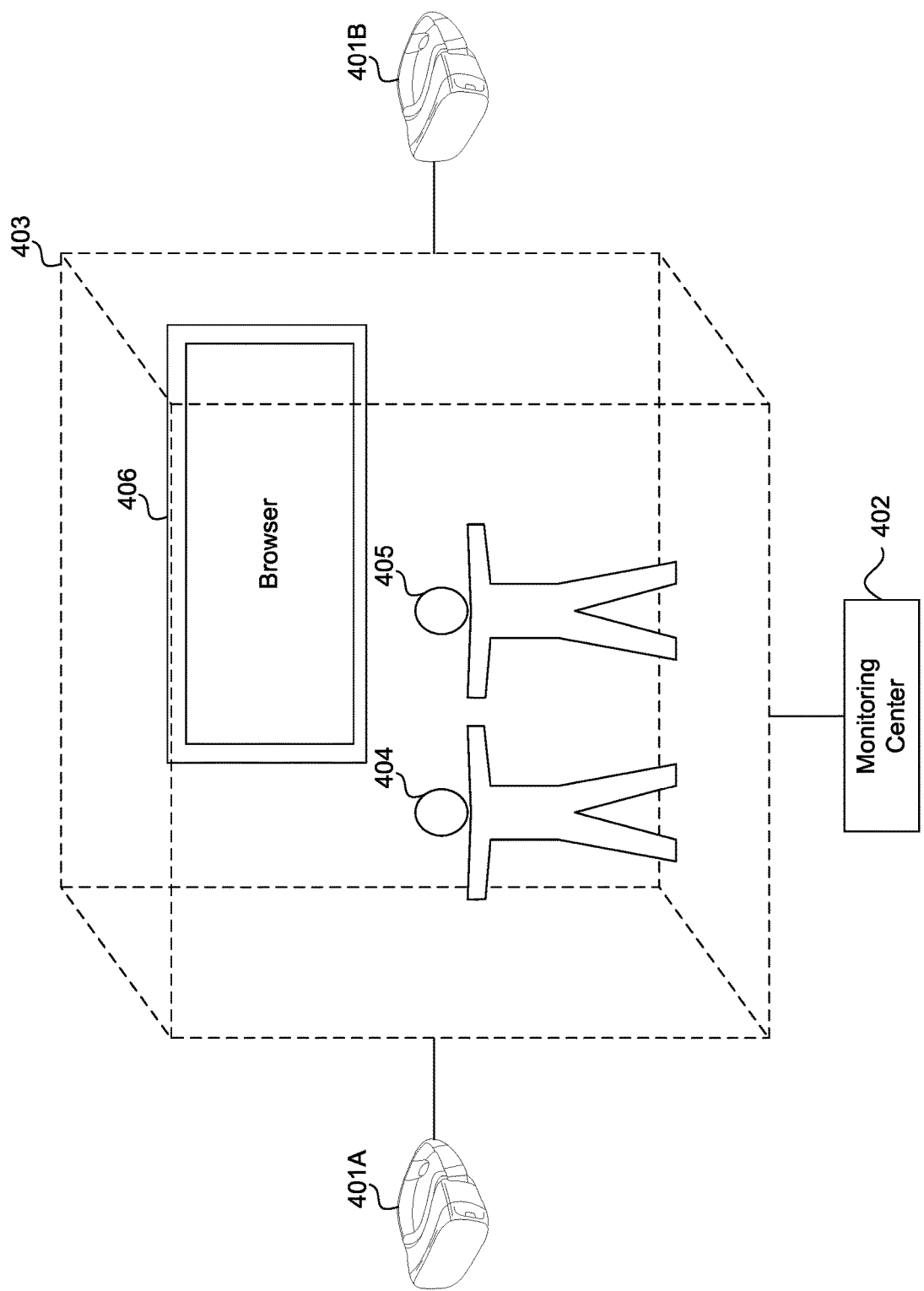
FIG. 4B illustrates a block diagram of a virtual reality communication system, according to embodiments of the present disclosure.

FIG. 4B depicts an exemplary embodiment of a virtual reality session 400B between inmate communication device 401A, outsider communication device 401B, and monitoring center 402. Virtual reality session 400B includes virtual reality communication 403 which depicts an exemplary image that is viewable by communication device 401A, outsider communication device 401B, and monitoring center 402. Virtual reality communication 403 includes virtual browser window 406 that is simultaneously viewable through a display of inmate communication device 401A, a display of outsider communication device 401B, and a display at monitoring center 402. Virtual browser window 406 is also controllable by users of inmate communication device 401A and outsider communication device 401B. Virtual browser window 406 can display information or content simultaneously to users of inmate communication device 401A and outsider communication device 401B. The information or content is also controllable by the users such that any user participating in virtual communication 403 to manipulate or interact with virtual browser window 406. In an embodiment, content includes game play activity such as a game that is played by a user of inmate communication device 401A and/or a user of outsider communication device 401B. Other content can also include displaying multimedia such as movies or television shows, documents such as emails, or websites. Users may control and interact with content displayed on virtual reality communication window 406 using input/output circuitry of inmate communication device 401A and/or a user of outsider communication device 401B or external input/output devices as discussed with respect to FIG. 3.

In an embodiment, virtual reality communication 403 provides an audio channel through users of inmate communication device 401A and outsider communication device 401B may talk with each other while interacting with the virtual browser window 406. Virtual reality communication also includes an inmate avatar 404 and an outsider avatar 405. Accordingly, users of inmate communication device 401A and outsider communication device 401B may talk with, view a virtual representation of each other, and interact with virtual elements of virtual reality communication 403.

Figure 4C:
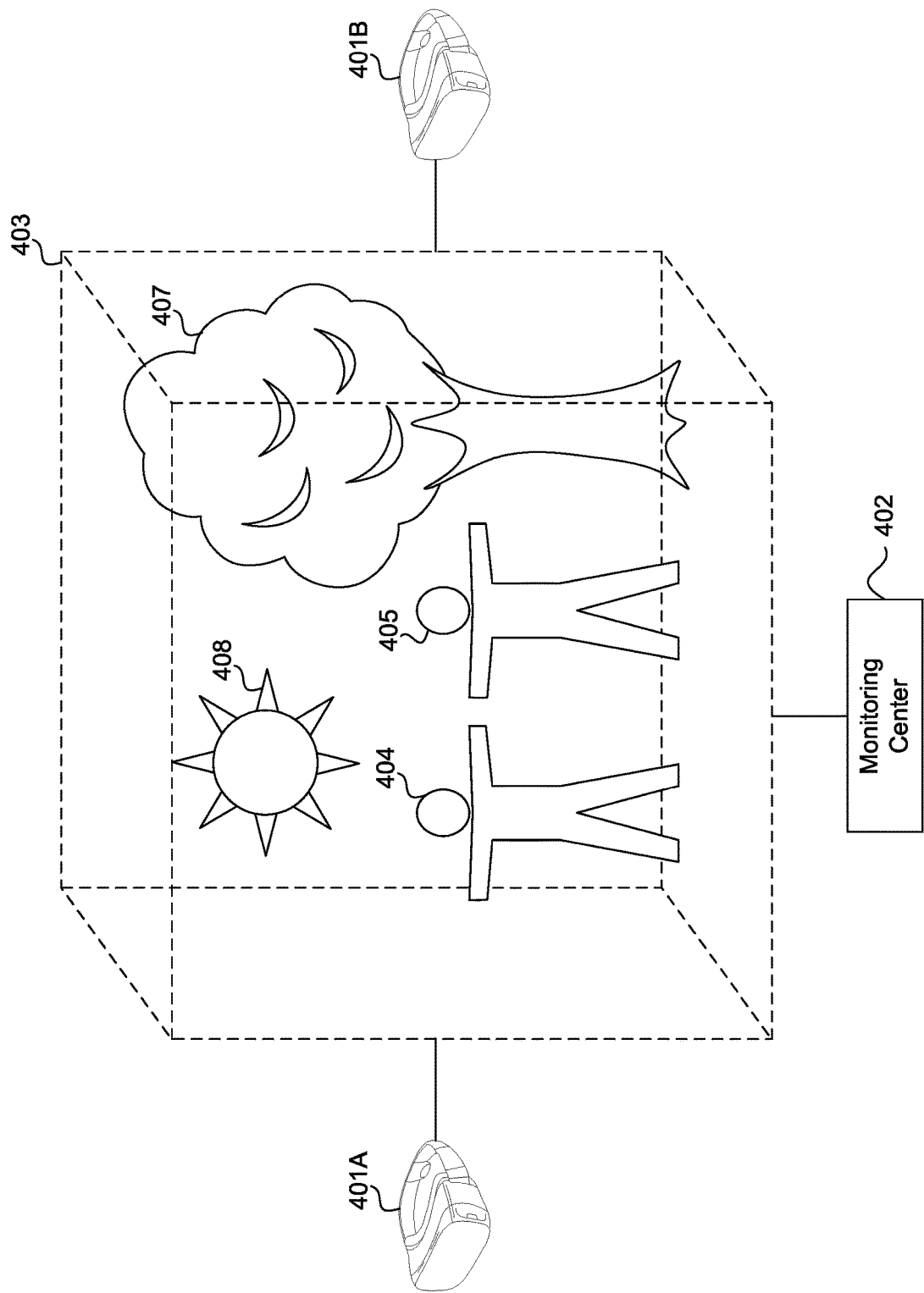
FIG. 4C illustrates a block diagram of a virtual reality communication system, according to embodiments of the present disclosure.

FIG. 4C depicts an exemplary embodiment of a virtual reality session 400A between inmate communication device 401A, outsider communication device 401B, and monitoring center 402. Virtual reality session 400C includes virtual reality communication 403 which depicts an exemplary image that is viewable by communication device 401A, outsider communication device 401B, and monitoring center 402. In an embodiment, virtual reality communication 403 includes a virtual reality environment having virtual elements such as a virtual sun 308 and virtual tree 307 that is simultaneously viewable through a display of inmate communication device 401A, a display of outsider communication device 401B, and a display at monitoring center 402. In an embodiment, users of inmate communication device 401A and outsider communication device 401B may select the virtual reality environment from a set of options pre-approved by the controlled environment. Examples of other environments include a beach, a forest, a house, or a store. In an embodiment, the virtual store environment is modeled on the controlled environment's commissary and the virtual elements include items that may be purchased by the user.

Operations of providing access, initiating communications, and monitoring communications within virtual reality communication system 100 in a correctional system will be described with respect to FIGS. 5-7. Although the physical devices and components that form the system have largely already been described, additional details regarding their more nuanced operation will be described below with respect to FIGS. 1-3. While FIGS. 5-7 contain methods of operation of authentication for virtual reality communication system 100, the operations are not limited to the order described below, and various operations can be performed in a different order. Further, two or more operations of each method can be performed simultaneously with each other.

Figure 5:
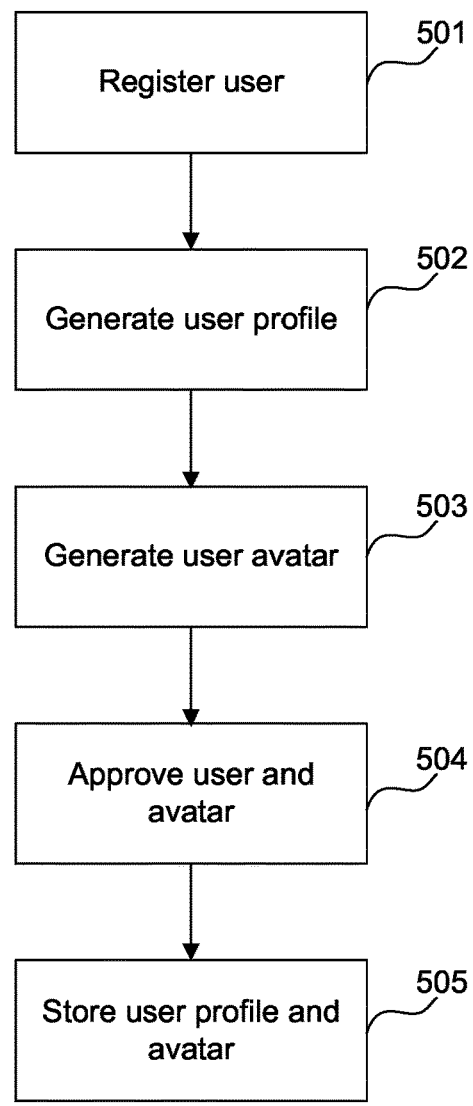
FIG. 5 illustrates a flowchart diagram of a method of registering a user via the communication system of FIG. 1, according to embodiments of the present disclosure.

FIG. 5 illustrates a flowchart diagram of a method 500 of registering a user via a virtual reality communication system, such as virtual reality communication system 100 of FIG. 1, according to embodiments of the present disclosure. In FIG. 5, a registration or enrollment process is facilitated for a party by inmate communication device 120 or outsider communication device 130. In 501, a user registers before or during the first use of virtual reality communication system 100. Registration may be performed via a website or IVR system, for example, when a party visits a designated website or calls a designated phone number facilitated by the controlled environment. In 501, profile subsystem 214 (as described with respect to FIG. 2) requests for initial information from the user via inmate communication device 120 or outsider communication device 130. The initial information can include name, birthdate, social security number, contact information, a biometric sample, and/or other essential data needed to verify the user and obtain additional information associated with the user, as described below. The initial information can also include preferences from the user regarding the user's avatar. These preferences allow the user to customize the appearance of the avatar such as the avatar's hair, facial features, clothing, and other physical attributes. Such preferences can allow the user to create an avatar with a similar virtual appearance as the user. The initial information may be received by input/output circuitry 330 of virtual reality communication device 300 and transmitted to communication center 110 via communication interface 320.

Once the initial information is received by communication center 110, profile subsystem 214 generates a user profile, such as an inmate profile, based on the initial information provided by the user at 502. Next, profile subsystem 214 generates an avatar based on the initial information provided by the user at 503. At 504, a component of the controlled environment, such as communication center 200, reviews the generated profile and avatar as part of a review process to ensure that the profile and avatar meet predefined standards. After review of the initial information, the generated profile, and the generated avatar, communication center 200 may accept the registration, at 504, or reject the registration. In an embodiment, during steps 501-503, all gathered and generated information obtained by communication center 110 is stored at 505 in a component of the controlled environment, such as in database 220 of communication center 200.

Figure 6:
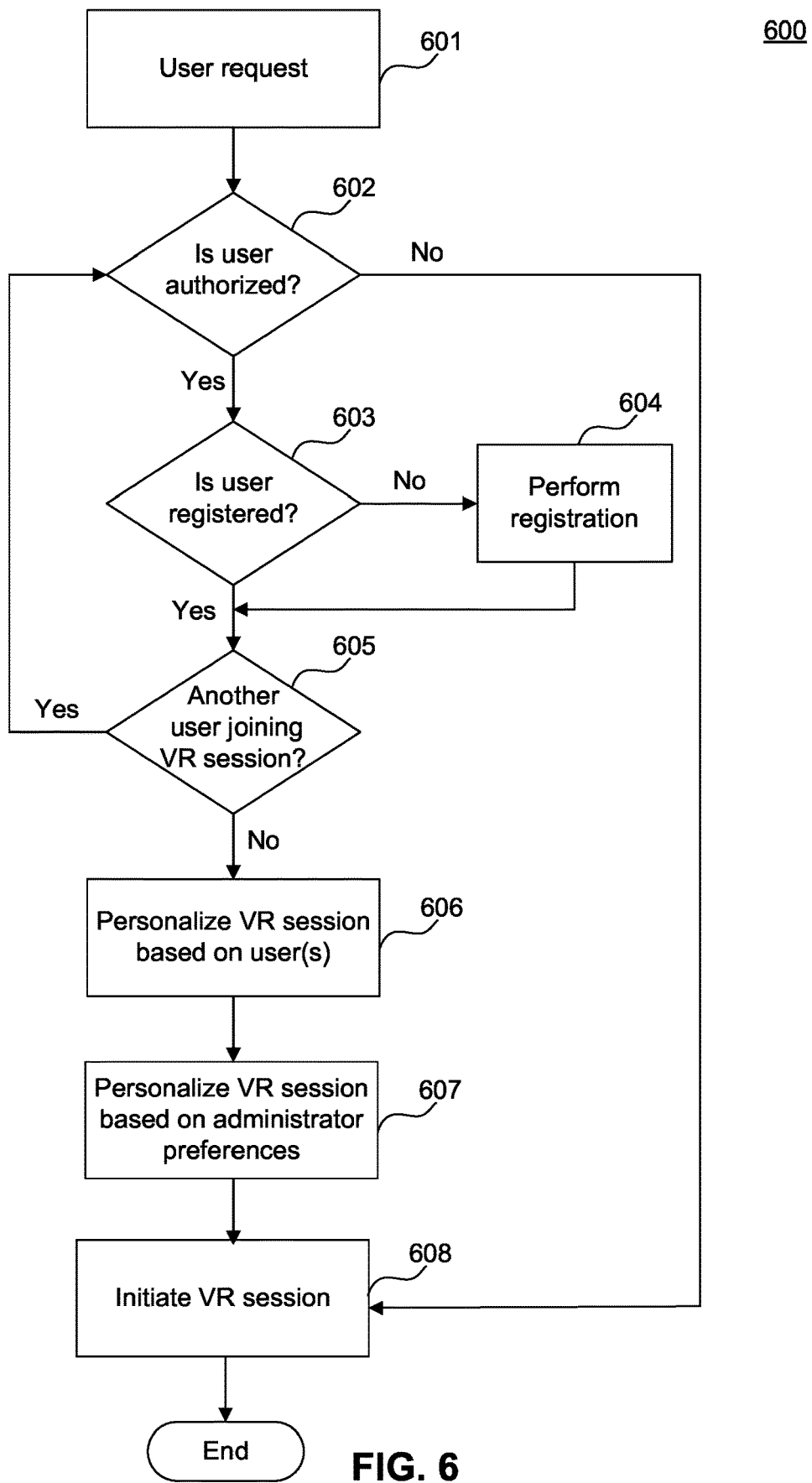
FIG. 6 illustrates a flowchart diagram of a method of initiating a virtual reality session via the communication system of FIG. 1, according to embodiments of the present disclosure.

FIG. 6 illustrates a flowchart diagram of a method 600 for initiating a virtual reality session via a virtual reality communication system, such as virtual reality communication system 100 of FIG. 1, according to embodiments of the present disclosure. At 601, a method of initiating a virtual reality session begins with a user request. The user request can be from an inmate of the controlled environment or may be from an outsider of the controlled environment. The user request is transmitted by the inmate's virtual reality communication device or the outsider's virtual communication device via virtual reality communication system 100. In an embodiment, submitting a user request requires special software provided by the controlled environment and installed on the virtual communication devices. For example, an inmate opens the special software and presses an icon to submit a request for a virtual reality session, which can be limited to only the inmate or can also include an outsider using outsider communication device 130.

Next, at 602, communication center 110 determines whether the user submitting the request is authorized to initiate a virtual reality session. Communication center 110 can make this determination based on information included in the user request such as the identity of the user, the virtual reality communication device from which the request is submitted, or any other information identifying the user and/or the virtual reality communication device. In an embodiment, authorizing the user includes authenticating the user's identity. Examples of authentication that may be performed include one or more of challenge questions and biometric verifications. For example, a party may be required to answer a challenge question including responding to questions regarding one or more of a previous addresses of the party, the name of the party, a birthdate of the party, a PIN, a name of someone associated with the party, or an identification number of the party. Further, a challenge question may request only a portion of the actual answer, such as only the last four digits of the party's social security number be a response. Combination of authentication processes may also occur and may include a rolling challenge question that requires the party to audibly or visually respond to the challenge question. Examples of combinations of authentication may include a response to a challenge question that requires a party to audibly state his/her mother's maiden name or for the party to respond to the answer either verbally or by touch paid while in front of a camera of inmate communication device 120 or outsider device 130 such that an audio sample, a video sample, or an image sample of the party is captured. In embodiment, authentication subsystem 216 receives required information from inmate communication device 120 or outsider communication device 130 and the received information is compared to stored identity data to determine whether the user is in fact authorized. If the user is not authorized, the method ends. If the user is authorized, communication center 110 can further determine whether the user is registered to use virtual reality communication system 100 at 603. In an embodiment, communication center 110 can retrieve the relevant information to make this determination from profile subsystem 214. If the user is not registered, a registration or enrollment process is performed at 604. An exemplary registration process may include steps described above for FIG. 5.

Upon determining that the user is authorized an registered, communication center 110 can then determine if any other users are joining the virtual reality session at 605. Method 600 repeats steps 602-604 for any additional users joining the virtual reality session. Once all users joining the session have been authorized and registered, communication center 110 personalizes the virtual reality session based on the user(s) and their profiles at 606. In an embodiment, personalizing the virtual reality session includes retrieving the profile(s) for each user and determining the preferences and other information related to the virtual reality session. Each profile can include information regarding the user's avatar, preferences for content such as games, applications, or virtual environments, and restrictions as to the content that is available or not available to the user and/or the virtual reality session. At 607, the virtual reality session is further personalized based on any administrator preferences. In an embodiment, this step entails retrieving the administrator preferences and implementing the rules and restrictions on the virtual reality session. As discussed above, administrator preferences may be applied on a global or in-mate specific basis. For example, administrator preferences may include global restrictions which limit all virtual reality sessions from accessing inappropriate websites using the virtual reality browser window. Based on this information from the user profiles and the administrator preferences, communication center 110 generates and initiates the virtual reality session at 608, and begins communicating the virtual reality session to the respective virtual reality communication devices of each user who is part of the virtual reality session.

Figure 7:
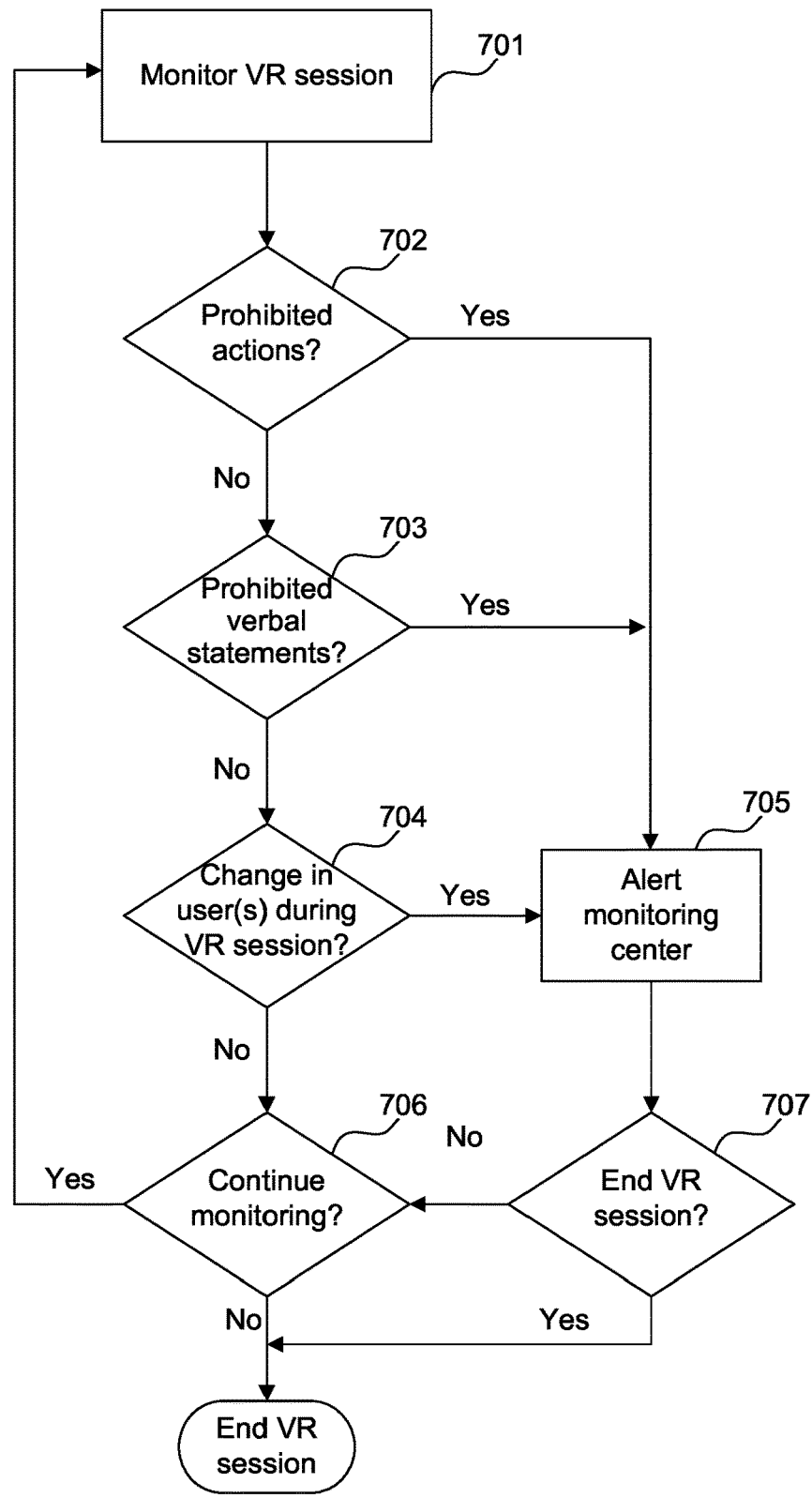
FIG. 7 illustrates a flowchart diagram of a method of monitoring a virtual reality session via the communication system of FIG. 1, according to embodiments of the present disclosure.

FIG. 7 illustrates a flowchart diagram of a method 700 for monitoring a virtual reality session via a monitoring system, such as monitoring center 140 of FIG. 1, according to embodiments of the present disclosure. At 701, monitoring center 140 begins monitoring a virtual reality session initiated through a virtual reality communication system, such as virtual reality communication system 100 of FIG. 1. At 702, monitoring center 140 continuously monitors visual information of the virtual reality session for any prohibited actions performed by any user within the virtual session. Prohibited actions can include any actions performed by a user's avatar that are determined by monitoring center 140 to be inappropriate for a virtual reality session. For example, prohibited actions include violent actions and lewd actions.

At 703, monitoring center 140 continuously monitors audio information of the virtual reality session for any prohibited verbal statements uttered by any user within the virtual session such as a session that involves more than one user. Prohibited verbal statements can include any comments stated by a user during the virtual session determined by monitoring center 140 to be inappropriate for a virtual reality session. For example, prohibited verbal statements can include curse words, lewd phrases, and/or sexual comments.

At 704, monitoring center 140 continuously monitors biometric information obtained from any user within the virtual session to prevent authorized users from giving the virtual reality communication device to a user that has not yet been authorized for the virtual reality session. As discussed above, in an embodiment, monitoring center 140 receives biometric information from communication center 110 which retrieves the biometric information from the virtual reality communication devices that are participating in the virtual reality session. Biometric information includes audio information, retinal or iris information, and facial information. During a virtual reality session, monitoring center 140 can compare current biometric information with original biometric information from the authorized user who initiated or joined the virtual reality session. If monitoring center 140 determines that there is difference between current biometric information and the original biometric information, monitoring center can determine that there has been a change in a user of the virtual reality communication device.

If any of the steps of 702-704 are determined to be positive, a component of monitoring center 140 generates an alert to inform an administrator or other personnel of monitoring center 140 at 705. The alert can indicate that a prohibited action, prohibited verbal statement, or a change in the authorized user has taken place in the virtual reality session. At 707, monitoring center 140 determines whether the positive determines of steps 702-704 triggers a termination of the virtual reality session. Finally, at 706, monitoring center 140 determines whether to continue monitoring the virtual reality session. If so, monitoring center 140 repeats steps 702-705.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 8:
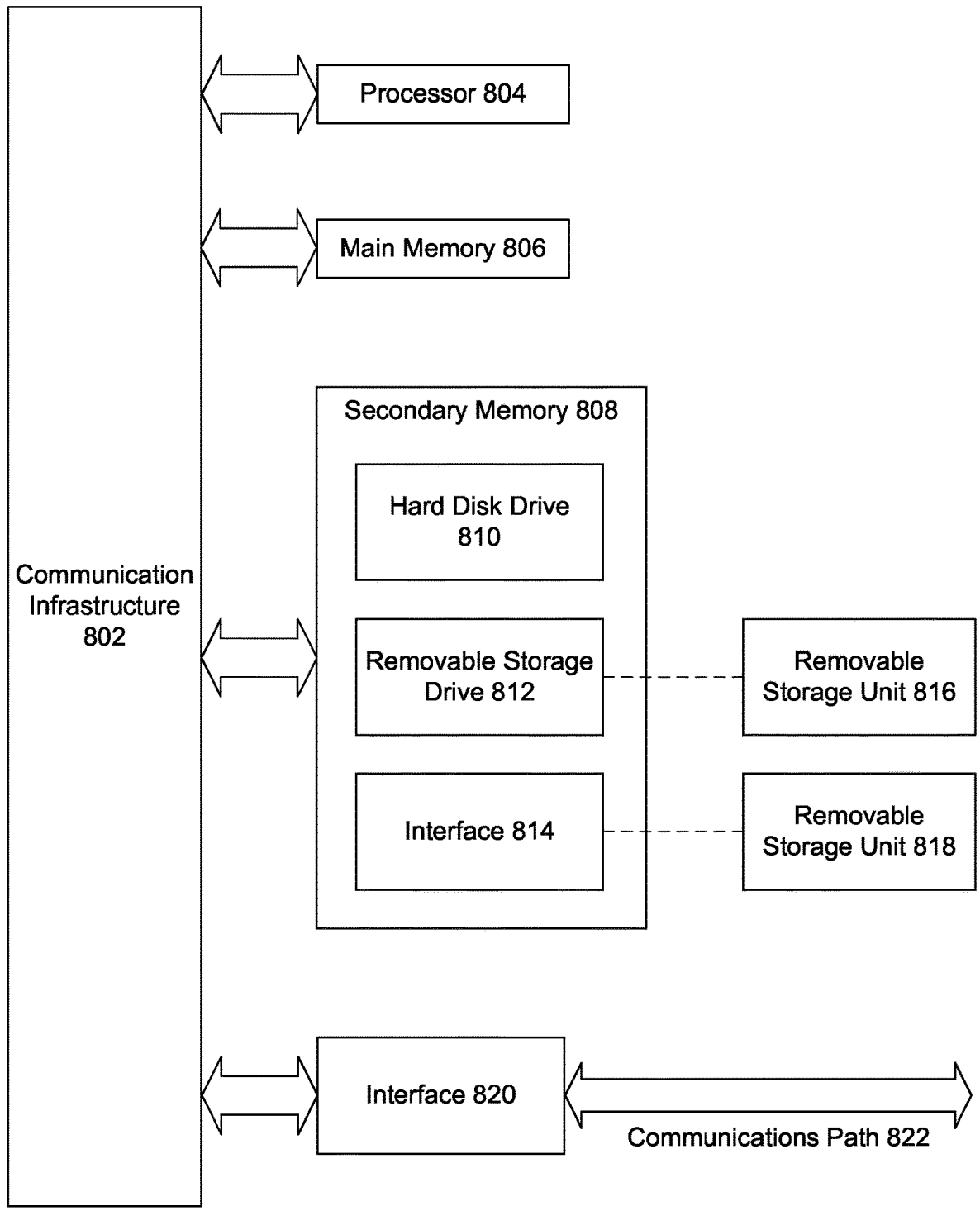
FIG. 8 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 5-7 can be implemented in the environment of one or more computer systems or other processing systems. An example of such a computer system 800 is shown in FIG. 8. One or more of the modules depicted in the previous figures can be at least partially implemented on one or more distinct computer systems 800.

Computer system 800 includes one or more processors, such as processor 804. Processor 804 can be a special purpose or a general purpose digital signal processor. Processor 804 is connected to a communication infrastructure 802 (for example, a bus or network). Various software implementations are described in terms of this exemplary computer system. After reading this description, it will become apparent to a person skilled in the relevant art(s) how to implement the disclosure using other computer systems and/or computer architectures.

Computer system 800 also includes a main memory 806, preferably random access memory (RAM), and may also include a secondary memory 808. Secondary memory 808 may include, for example, a hard disk drive 810 and/or a removable storage drive 812, representing a floppy disk drive, a magnetic tape drive, an optical disk drive, or the like. Removable storage drive 812 reads from and/or writes to a removable storage unit 816 in a well-known manner. Removable storage unit 816 represents a floppy disk, magnetic tape, optical disk, or the like, which is read by and written to by removable storage drive 812. As will be appreciated by persons skilled in the relevant art(s), removable storage unit 816 includes a computer usable storage medium having stored therein computer software and/or data.

In alternative implementations, secondary memory 808 may include other similar means for allowing computer programs or other instructions to be loaded into computer system 800. Such means may include, for example, a removable storage unit 818 and an interface 814. Examples of such means may include a program cartridge and cartridge interface (such as that found in video game devices), a removable memory chip (such as an EPROM, or PROM) and associated socket, a thumb drive and USB port, and other removable storage units 818 and interfaces 814 which allow software and data to be transferred from removable storage unit 818 to computer system 800.

Computer system 800 may also include a communications interface 820. Communications interface 820 allows software and data to be transferred between computer system 800 and external devices. Examples of communications interface 820 may include a modem, a network interface (such as an Ethernet card), a communications port, a PCM-CIA slot and card, etc. Software and data transferred via communications interface 820 are in the form of signals which may be electronic, electromagnetic, optical, or other signals capable of being received by communications interface 820. These signals are provided to communications interface 820 via a communications path 822. Communications path 822 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 816 and 818 or a hard disk installed in hard disk drive 810. These computer program products are means for providing software to computer system 800.

Computer programs (also called computer control logic) are stored in main memory 806 and/or secondary memory 808. Computer programs may also be received via communications interface 820. Such computer programs, when executed, enable the computer system 800 to implement the present disclosure as discussed herein. In particular, the computer programs, when executed, enable processor 804 to implement the processes of the present disclosure, such as any of the methods described herein. Accordingly, such computer programs represent controllers of the computer system 800. Where the disclosure is implemented using software, the software may be stored in a computer program product and loaded into computer system 800 using removable storage drive 812, interface 814, or communications interface 820.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A method for monitoring a virtual reality session that includes a first device located within a controlled environment and a second device located outside of the controlled environment, the method comprising:
    receiving, by a monitoring center of the controlled environment, information associated with a virtual reality session, wherein the virtual reality session is between the first device and the second device, and wherein the information includes video information of the virtual reality session and audio information of the virtual reality session;
    monitoring, by the monitoring center, the video information of the virtual reality session for a first alert condition that is based on detection of a prohibited visual action in the video information;
    monitoring, by the monitoring center, the audio information of the virtual reality session for a second alert condition that is based on a prohibited audio action in the audio information; and
    generating an alert based on at least one of the first alert condition and the second alert condition.

2. The method of claim 1, wherein the alert is configured to terminate the virtual reality session.

3. The method of claim 1, wherein the video information of the virtual reality session comprises a plurality of actions performed by an avatar associated with the first device in the virtual reality session and the monitoring the video information of the virtual reality session for the first alert condition further comprises:
    analyzing the video information of the virtual reality session to detect an action in the plurality of actions; and
    identifying the detected action as the prohibited visual action, wherein the alert includes the detected action.

4. The method of claim 1, wherein the audio information of the virtual reality session comprises a plurality of verbal statements associated with the first device in the virtual reality session and the monitoring the audio information of the virtual reality session for the second alert condition further comprises:
    analyzing the audio information of the virtual reality session to detect a verbal statement in the plurality of verbal statements; and
    identifying the detected verbal statement as the prohibited audio action, wherein the alert includes the detected verbal statement.

5. The method of claim 1, wherein the information further includes biometric information of a user associated with the first device and wherein the biometric information includes at least one of a retinal sample, facial information, or a voice sample.

6. The method of claim 5, further comprising:
    monitoring, by the monitoring center, the biometric information for a third alert condition, wherein the third alert condition is based on detection of an unauthorized user in the virtual reality session.

7. The method of claim 6, wherein the biometric information further includes original biometric information retrieved during an initiation of the virtual reality session and current biometric information retrieved after the initiation of the virtual reality session.

8. The method of claim 7, wherein monitoring the biometric information for the third alert condition further comprises:
    comparing the original biometric information and the current biometric information;
    determining, based on the comparing, a difference between the original biometric information and the current biometric information; and
    detecting the unauthorized user in the virtual reality session based on the difference.

9. The method of claim 1, wherein the video information of the virtual reality session includes at least one of a plurality of actions taken by an avatar in the virtual reality session and a plurality of interactions between avatars in the virtual reality session.

10. The method of claim 1, further comprising:
    recording the information associated with the virtual reality session, wherein monitoring the video information of the virtual reality session and monitoring the audio information of the virtual reality session is performed on the recorded information.

11. The method of claim 1, further comprising:
    providing, by the monitoring center, authorized content that is available to be used within the virtual reality session, wherein the authorized content is based on a user profile associated with the first device.

12. A monitoring center within a controlled environment for monitoring a virtual reality session that includes a device located within the controlled environment, the monitoring center comprising:
    a memory;
    a processor configured to:
        receive information associated with a virtual reality session, wherein the virtual reality session is between a first device located within the controlled environment and a second device located outside of the controlled environment, and wherein the information includes video information of the virtual reality session and audio information of the virtual reality session;
        continuously monitor, during the virtual reality session, the video information of the virtual reality session for a first alert condition that is based on detection of a prohibited visual action in the video information;
        continuously monitor, during the virtual reality session, the audio information of the virtual reality session for a second alert condition that is based on a prohibited audio action in the audio information; and
        generate an alert based on at least one of the first alert condition and the second alert condition.

13. The monitoring center of claim 12, wherein the alert is configured to terminate the virtual reality session.

14. The monitoring center of claim 12, the video information of the virtual reality session comprises a plurality of actions performed by an avatar associated with the first device in the virtual reality session and in continuously monitoring the video information of the virtual reality session for the first alert condition, the processor is further configured to:
- analyze the video information of the virtual reality session to detect an action in the plurality of actions; and
- identify the detected action as the prohibited visual action, wherein the alert includes the detected action.

15. The monitoring center of claim 12, wherein the audio information of the virtual reality session comprises a plurality of verbal statements associated with the first device in the virtual reality session and in continuously monitoring the audio information of the virtual reality session for the second alert condition, the processor is further configured to:
- analyze the audio information of the virtual reality session to detect a verbal statement in the plurality of verbal statements; and
- identify the detected verbal statement as the prohibited audio action, wherein the alert includes the detected verbal statement.

16. The monitoring center of claim 12, wherein the information includes biometric information of a user associated with the first device and wherein the biometric information includes at least one of a retinal sample, facial information, or a voice sample.

17. The monitoring center of claim 16, the processor further configured to:
- monitor the biometric information for a third alert condition, wherein the third alert condition is based on detection of an unauthorized user in the virtual reality session.

18. A non-transitory computer-readable medium having instructions stored therein, which when executed by a processor in a monitoring center of a controlled environment cause the processor to perform operations, the operations comprising:
- receiving information associated with a virtual reality session, wherein the virtual reality session is between a first device located within the controlled environment and a second device located outside of the controlled environment, and wherein the information includes video information of the virtual reality session and audio information of the virtual reality session;
- continuously monitoring, during the virtual reality session, the video information of the virtual reality session for a first alert condition that based on detection of a prohibited visual action in the video information;
- continuously monitoring, during the virtual reality session, the audio information of the virtual reality session for a second alert condition that is based on a prohibited audio action in the audio information; and
- generating an alert based on at least one of the first alert condition and the second alert condition.

19. The non-transitory computer-readable medium of claim 18, wherein the alert is configured to terminate the virtual reality session.

20. The non-transitory computer-readable medium of claim 18, wherein the information includes biometric information of a user associated with the first device and wherein the biometric information includes at least one of a retinal sample, facial information, or a voice sample.

* * * * *